Patented Aug. 11, 1925.

1,548,975

UNITED STATES PATENT OFFICE.

WARREN F. BLEECKER, OF BOULDER, COLORADO.

IMPERVIOUS MATERIAL.

No Drawing.   Application filed February 1, 1922.   Serial No. 533,488.

*To all whom it may concern:*

Be it known that I, WARREN F. BLEECKER, a citizen of the United States, residing at Boulder, in the county of Boulder and State of Colorado, have invented certain new and useful Improvements in Impervious Materials, of which the following is a specification.

This invention relates to impervious and chemical resistant material and a process of producing the same, and its primary object is to provide a material suitable for making conduits, vessels, pump-parts and other objects used in laboratories, chemical plants and factories, which is impervious to liquid and gases and proof against the corrosive action of acids and other chemicals, and which in addition to great mechanical strength, has the property of being heat-resistant to a degree which renders it particularly suitable for use in high temperature furnaces or for holding or conveying hot acids and other liquids.

I attain this object by impregnating artificial graphite with metallic lead so that all its pores or cells and crevices are completely filled.

The lead filling entered into the voids of the graphite forms a permanent and solid part thereof. It effectively prevents the penetration of liquids or gases into the spaces it occupies and its natural faculty of resisting the corrosive action of acids and other chemicals by the protective crustation of filming of its surface, added to the chemical-resistant qualities of the graphite, renders the impregnated material of particular value in processes in which acids and other corrosive chemicals are employed.

Moreover, the metallic lead, owing to its high melting point, retains its efficiency under temperature conditions which would cause fillings of different material to melt or burn, and the impregnated graphite which itself is heat-resistant to a high degree, is by virtue of the above, particularly adapted to form articles such as conduits, jets, valves and pump-parts used to hold or convey acids, chemicals and other liquids at a high temperature.

The impregnation of the graphite with the metallic lead may be effected by placing it in a partial vacuum in a retort or other closed container which is heated to a temperature slightly above the melting point of the lead, and then admitting the latter in a melted condition to the evacuated space until the graphite is completely covered.

The molten matter may if so desired, be entered into the retort under pressure and by drawing its surplus off the graphite and cleaning the surface of the latter, the process of impregnation is completed.

It will be understood that the artificial graphite may be impregnated with the lead before or after the article is formed.

Having thus described my invention what I claim and desire to secure by Letters Patent is:

1. A material of the character described consisting of a body of artificial graphite and metallic lead occupying the pores thereof.

2. A material of the character described, consisting of a body of artificial graphite the voids of which are closed by metallic lead.

3. An impervious and chemically resistant material consisting of a body of artificial graphite the voids of which are closed by fillers of chemically resistant metal.

In testimony whereof I have affixed my signature.

WARREN F. BLEECKER.